(12) United States Patent
Sagot et al.

(10) Patent No.: US 10,997,238 B2
(45) Date of Patent: May 4, 2021

(54) METHOD FOR STORING A MULTIMEDIA CONTENT, ASSOCIATED READING METHOD AND METHOD FOR MANAGING A STORAGE SPACE CONTAINING SUCH A CONTENT

(71) Applicant: SAGEMCOM BROADBAND SAS, Rueil Malmaison (FR)

(72) Inventors: Didier Sagot, Rueil Malmaison (FR); Julien Bellanger, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 16/313,844

(22) PCT Filed: Jun. 26, 2017

(86) PCT No.: PCT/EP2017/065735
§ 371 (c)(1),
(2) Date: Dec. 27, 2018

(87) PCT Pub. No.: WO2018/001978
PCT Pub. Date: Jan. 4, 2018

(65) Prior Publication Data
US 2019/0155845 A1   May 23, 2019

(30) Foreign Application Priority Data
Jul. 1, 2016   (FR) ........................................ 1656324

(51) Int. Cl.
*H04H 60/33*     (2008.01)
*G06F 16/71*     (2019.01)
(Continued)

(52) U.S. Cl.
CPC ............ *G06F 16/71* (2019.01); *G06F 16/437* (2019.01); *H04N 21/4334* (2013.01);
(Continued)

(58) Field of Classification Search
CPC ........... H04N 21/4335; H04N 21/4532; H04N 21/4424; H04N 21/44213; H04N 21/4334
(Continued)

(56) References Cited

U.S. PATENT DOCUMENTS 7,010,685 B1 * 3/2006 Candelore ................ H04K 1/00
348/E5.004
7,068,789 B2 * 6/2006 Huitema ........... H04L 29/12009
380/277

(Continued)

FOREIGN PATENT DOCUMENTS

JP   2007323566 A   12/2007
WO  2011124810 A1   10/2011

OTHER PUBLICATIONS

"Content, n. 1." OED Online, Oxford University Press, Jun. 2017, www.oed.conn/view/Entry/40144. Accessed Dec. 22, 2017.*
(Continued)

*Primary Examiner* — Michael B. Pierorazio
(74) *Attorney, Agent, or Firm* — Pillsbury Winthrop Shaw Pittman LLP

(57) ABSTRACT

A storage method for storing a multimedia content by an electronic device, the electronic device including a database containing a list of users and a table of recordings, a system adapted to acquire the multimedia content, a calculation system and a storage system, the storage method including allocating a storage space on the storage system by the calculation system; adding an entry relating to the multimedia content stored in the table of recordings; acquiring the multimedia content and writing to memory the multimedia
(Continued)

content in the allocated storage space, and creating a table of users relating to the stored multimedia content, the table of users including, for each user of a sub-set of the list of users contained in the database, one or more context data.

4 Claims, 10 Drawing Sheets

(51) Int. Cl.
    *H04N 21/433* (2011.01)
    *H04N 21/442* (2011.01)
    *H04N 21/45* (2011.01)
    *H04N 21/4335* (2011.01)
    *G06F 16/435* (2019.01)

(52) U.S. Cl.
    CPC ..... *H04N 21/4335* (2013.01); *H04N 21/4424* (2013.01); *H04N 21/44213* (2013.01); *H04N 21/4532* (2013.01)

(58) Field of Classification Search
    USPC .......................................................... 725/10
    See application file for complete search history.

(56) References Cited

U.S. PATENT DOCUMENTS

| | | | | |
|---|---|---|---|---|
| 7,614,069 B2* | 11/2009 | Stone | H04N 5/765 | 725/87 |
| 7,650,624 B2* | 1/2010 | Barsoum | H04N 7/17318 | 725/138 |
| 8,032,911 B2* | 10/2011 | Ohkita | H04L 12/282 | 370/402 |
| 8,121,706 B2* | 2/2012 | Morikawa | H04L 12/2814 | 340/4.3 |
| 8,381,310 B2* | 2/2013 | Gangotri | G06F 21/10 | 726/30 |
| 2002/0174430 A1* | 11/2002 | Ellis | G11B 27/34 | 725/46 |
| 2003/0056093 A1* | 3/2003 | Huitema | H04L 29/12009 | 713/156 |
| 2004/0117856 A1* | 6/2004 | Barsoum | H04N 21/235 | 725/138 |
| 2005/0097563 A1 | 5/2005 | Bidet et al. | | |
| 2005/0216942 A1* | 9/2005 | Barton | H04N 7/17318 | 725/97 |
| 2005/0283815 A1* | 12/2005 | Brooks | H04H 20/78 | 725/126 |
| 2005/0289632 A1* | 12/2005 | Brooks | H03H 7/461 | 725/126 |
| 2006/0010481 A1* | 1/2006 | Wall | H04N 7/163 | 725/151 |
| 2006/0111144 A1* | 5/2006 | Nakajima | H04L 63/04 | 455/556.1 |
| 2006/0212197 A1* | 9/2006 | Butler | B60R 11/0235 | 701/36 |
| 2006/0225105 A1* | 10/2006 | Russ | H04N 7/17318 | 725/78 |
| 2007/0050822 A1* | 3/2007 | Stevens | H04N 7/14 | 725/74 |
| 2007/0067808 A1* | 3/2007 | DaCosta | H04N 7/17318 | 725/62 |
| 2007/0079341 A1* | 4/2007 | Russ | H04L 12/2805 | 725/89 |
| 2007/0101185 A1* | 5/2007 | Ostrowka | H04N 21/47214 | 714/6.13 |
| 2007/0124775 A1* | 5/2007 | DaCosta | H04H 60/372 | 725/62 |
| 2007/0130601 A1* | 6/2007 | Li | H04N 21/2225 | 725/112 |
| 2007/0157281 A1* | 7/2007 | Ellis | H04N 7/17309 | 725/134 |
| 2007/0282990 A1* | 12/2007 | Kumar | H04L 65/1016 | 709/223 |
| 2008/0013919 A1* | 1/2008 | Boston | G11B 19/00 | 386/291 |
| 2008/0092168 A1* | 4/2008 | Logan | G10H 1/0033 | 725/44 |
| 2008/0134245 A1* | 6/2008 | DaCosta | H04N 7/17318 | 725/44 |
| 2008/0134256 A1* | 6/2008 | DaCosta | H04N 7/17318 | 725/62 |
| 2008/0155615 A1* | 6/2008 | Craner | H04N 21/8455 | 725/91 |
| 2008/0235733 A1* | 9/2008 | Heie | H04N 7/163 | 725/46 |
| 2008/0244658 A1* | 10/2008 | Chen | H04N 7/17318 | 725/50 |
| 2008/0263611 A1* | 10/2008 | Lecomte | H04N 5/4401 | 725/114 |
| 2009/0100478 A1 | 4/2009 | Craner et al. | | |
| 2009/0183199 A1* | 7/2009 | Stafford | H04H 60/375 | 725/34 |
| 2009/0205010 A1* | 8/2009 | Rodriguez | H04N 5/45 | 725/151 |
| 2009/0313662 A1* | 12/2009 | Rodriguez | H04N 19/46 | 725/87 |
| 2010/0005483 A1* | 1/2010 | Rao | H04L 63/0428 | 725/25 |
| 2010/0071076 A1* | 3/2010 | Gangotri | G06F 21/10 | 726/32 |
| 2010/0125876 A1* | 5/2010 | Craner | H04N 21/47202 | 725/61 |
| 2011/0191439 A1* | 8/2011 | Dazzi | G06F 15/16 | 709/217 |
| 2011/0191446 A1* | 8/2011 | Dazzi | G06F 15/16 | 709/219 |
| 2012/0309515 A1* | 12/2012 | Chung | H04N 21/274 | 463/31 |

OTHER PUBLICATIONS

"Content" Merriam-Webster.com Dictionary, Merriam-Webster, Aug. 2020, https://www.merriam-webster.com/dictionary/content. Accessed Aug. 13, 2020.*
"Content provider" Cambridge Dictionary, Cambridge University Press, Aug. 2020, https://dictionary.cambridge.org/us/dictionary/english/content-provider. Accessed Aug. 13, 2020.*
International Search Report and Written Opinion dated Sep. 1, 2017 in International Application PCT/EP2017/065735.

* cited by examiner

METHOD FOR STORING A MULTIMEDIA CONTENT, ASSOCIATED READING METHOD AND METHOD FOR MANAGING A STORAGE SPACE CONTAINING SUCH A CONTENT

CROSS REFERENCE TO RELATED APPLICATIONS

This application is the U.S. National Stage of PCT/EP2017/065735 filed Jun. 26, 2017, which in turn claims priority to French Application No. 1656324, filed Jul. 1, 2016. The contents of both applications are incorporated herein by reference in their entirety.

TECHNICAL FIELD OF THE INVENTION

The technical field of the invention is that of devices for reading and recording multimedia content. The invention more specifically relates to a method for storing a multimedia content, a method for managing a storage space containing one or more multimedia contents and a method for reading a multimedia content.

TECHNOLOGICAL BACKGROUND OF THE INVENTION

The recording of multimedia content has been democratised over the last few years. Formerly limited to supports such as DVDs or VHS cassettes, the recording of multimedia content is henceforth carried out on mass storage means such as hard discs for example. The quality of multimedia streams has also led to an increase in the size of the files required for the recording thereof. It is thus indispensable to manage storage spaces in an efficient manner while ensuring that multimedia content already viewed is deleted and that multimedia content not viewed is not deleted by mistake. Moreover, the multiplication of the content and the origins thereof henceforth requires different reading parameters as a function of the multimedia content. One content may for example require sub-titles whereas a second content will not have the same requirement.

In order to respond to these problems, it is known to associate context data with each recorded multimedia content. These context data may for example concern the language used for the sub-titles or instead the reading position at which the reading has been stopped during the last viewing. For each multimedia content, the user can also request the deletion which will only be carried out most times after a step of confirmation by the user.

Such systems, although they are perfectly suitable for a mono-user context, are not efficiently adapted to the multi-user context, which is all the same frequent, a club being composed on average of four persons. In this type of context, each person may be brought to watch or to request the deletion of a content at a different moment or instead to stop the viewing at a different instant. This is not without posing problems of loss of reading position for certain users or even deletion of a multimedia content not yet viewed.

In order to limit the aforementioned drawbacks, it has been proposed in the document US 2009 0100478 to allocate a storage space quota to each user. Thus, each user manages his recordings independently of the other users. However, this solution leads to storing the same recordings several times and thus does not make it possible to optimise storage space. Moreover, each user being managed independently, the system does not make it possible to take into account interactions between users, such as two users who could view a same recorded multimedia content. The system, rather than proposing a multi-user management taking into account potential interactions between the different users, only proposes a plurality of mono-user environments only having for single interaction the storage quotas.

There thus exists a need for a method for reading and managing multimedia content, notably the space necessary for the storage thereof, making it possible to deal with a multi-user context.

SUMMARY OF THE INVENTION

The invention offers a solution to the aforementioned problems, by creating during the recording of a multimedia content, for each multimedia content, a table of users including, for each user, context data associated with the multimedia content. Using these context data, it is possible to manage the multimedia content, and thus the space that it occupies, as a function of the context data associated with each user for the multimedia content in question.

To do so, a first aspect of the invention relates to a method for storing a multimedia content by an electronic device, said device comprising a database containing a list of users and a table of recordings, a means for acquiring the multimedia content, a calculation means and a storage means; said storage method including:
  a first step of allocating a storage space on the storage means;
  a second step of adding an entry relating to the multimedia content stored in the table of recordings;
  a third step of acquisition of the multimedia content and writing to memory the multimedia content in the allocated storage space.

The method according to a first aspect of the invention further includes a fourth step of creating a table of users relating to the stored multimedia content, said table of users including, for each user of a sub-set of the list of users contained in the database, one or more context data.

Sub-set is taken to mean part at least of the users contained in the database. Obviously, this sub-set could contain all the users contained in the database. It could also only contain simply a part of the users contained in the database, for example all the users above a certain age, in order to take account of the specificity of a multimedia content.

Thus, each multimedia content is allocated a table of users including, for each user, one or more context data. In other words, a table of users corresponds to a single multimedia content.

This storage method thus makes it possible to implement a multi-user management of the stored multimedia content. This multi-user management must not be understood here as the successive establishment of mono-user sessions but as the opening of a session taking into account a multitude of users. This multi-user management makes it possible to take into account the different possible interactions between the different users whether at the level of the storage of the multimedia content, the reading of the multimedia content, or the management of the storage space containing the multimedia content.

Apart from the characteristics that have been described in the preceding paragraph, the storage method according to a first aspect of the invention may have one or more additional characteristics among the following, considered individually or according to all technically possible combinations thereof.

Advantageously, the table of users includes, for each user:

a first context datum relating to the position of reading the multimedia content, called reading position; and/or a second context datum relating to the recording request, called recording request datum, indicating if the user has requested the recording of the multimedia content; and/or a third context datum relating to the deletion request, called deletion request datum, indicating if the user has requested the deletion of the multimedia content; and/or a fourth context datum relating to the locking request, called locking request datum, indicating if the user has requested the locking of the multimedia content.

Preferably, the step of creation of a table of users and initialisation of the first, second, third and/or fourth context data of the table of users takes place during the second step of adding an entry relating to the multimedia content in the table of recordings.

Advantageously, when the multimedia content is currently being viewed by at least one user during the step of acquisition and writing to memory of said multimedia content, the method includes:

a step of identification of the user;

at the stopping of the viewing of said multimedia content, a step of updating the context data of said user in the table of users associated with said multimedia content.

Thus the method makes it possible to take account of the fact that a user has viewed at least in part said multimedia content during its acquisition and its writing to memory through context data.

A second aspect of the invention relates to a method for managing a storage space by an electronic device, said device comprising a database containing a list of users and a table of recordings, a calculation means and a storage means, said storage means containing at least one multimedia content stored using a storage method according to a first aspect of the invention as well as the table of users associated with said multimedia content, said method including:

a step of inputting an order for deletion of a multimedia content;

a step of analysing the context data of the table of users associated with said multimedia content;

a step of actual deletion of the multimedia content, said deletion being conditioned by the step of analysing the context data.

Advantageously, the step of actual deletion of the multimedia content includes:

a first sub-step of freeing the storage space allocated to the multimedia content;

a second sub-step of deletion of the user table associated with the multimedia content;

a third sub-step of deletion of the entry associated with the multimedia content in the table of recordings.

Thanks to this second aspect of the invention, the management of the storage space takes place while taking into account, for each multimedia content, the set of users of the table of users associated with said multimedia content. Indeed, for each deletion of a multimedia content, the method according to a second aspect of the invention analyses the table of users associated with the multimedia content to delete. This table of users including for the multimedia content to delete the context data associated with each user of the table of users, it is possible to take into account the context data associated with each user before carrying out the actual deletion.

Actual deletion is taken to mean a deletion freeing the storage space allocated for the multimedia content. It is designated as actually deleted as opposed to a deletion that makes a multimedia content disappear from the selection list for a given user, without however freeing the storage space associated with the multimedia content. Thus, in the case of a deletion of a multimedia content, the multimedia content could appear as being deleted for one user and as non-deleted for a second user and the storage space allocated to the multimedia content will not be freed. On the other hand, in the case of an actual deletion, the multimedia content will appear as deleted for the set of users and the storage space allocated to the multimedia content will be freed.

Advantageously, the method for managing a storage space includes, before the step of inputting a deletion order, a step of identification of a user, the step of inputting a deletion order being carried out by the identified user.

Advantageously, the method for managing a storage space includes between the step of inputting a deletion order and the step of analysing the context data, a step of updating the context data associated with the user having input the deletion order in the table of users associated with the selected multimedia content.

Advantageously, the list of users includes, for each user, one or more communication data corresponding to the communication means and the method includes, after the step of analysing the context data and when one or more users of the user table associated with the selected multimedia content have not requested the deletion and/or have requested the locking of said multimedia content, a step of sending a message to said users using said communication data.

Advantageously, the step of analysing the context data includes a sub-step of verification, for each of the users of the table of users associated with the selected multimedia content, of the deletion request datum in the table of users associated with the selected multimedia content, the step of actual deletion only taking place when each user of the table of users associated with the selected multimedia content has requested the deletion of said content.

Thus, the deletion of a multimedia content is only effective if all of the users of the table of users have made the request. It is thus possible to take into account interactions between the different users in the management of the storage of the multimedia content. This management takes place at the scale of each multimedia content through the table of users that is associated therewith, each multimedia content being associated with a single table of users and each table of users being associated with a single multimedia content. It is thus possible to carry out a very delicate management of the storage space.

Advantageously, the step of analysing the context data includes a second sub-step of verification, for each of the users of the table of users associated with the multimedia content, of the locking request datum in the table of users associated with the selected multimedia content, the step of actual deletion only taking place when each user of the table of users associated with the selected multimedia content has requested the deletion of said content and that no user of the table of users associated with the selected multimedia content has requested the locking of said content.

Thus, a user may object to the actual deletion of the multimedia content by locking said content.

A third aspect of the invention relates to a method for reading a multimedia content by an electronic device, said device comprising a database containing a list of users and a table of recordings, a calculation means and a storage means, said storage means containing at least one multimedia content stored using a storage method according to the invention as well as the table of users associated with said multimedia content, said method including:
- a step of identification of a user;
- a step of selection of a multimedia content by the identified user;
- a step of launching the reading of the selected multimedia content, the reading parameters depending on the context data associated with the identified user and contained in the table of users.

Thus, the reading method takes into account the context data in order to adapt the step of launching the reading to said context data.

Apart from the characteristics that have been mentioned in the preceding paragraph, the reading method according to a third aspect of the invention may have one or more additional characteristics among the following, considered individually or according to all technically possible combinations thereof.

Advantageously, the step of launching the reading is preceded by a step of creating a watching user table, the identified user being added to said table of watching users during the creation of said table of watching users.

Thus, the table of watching users makes it possible to ensure a monitoring of the users viewing the multimedia content being read. As will be seen hereafter, the latter may be updated while being viewed and thus makes it possible to facilitate the multi-user management of the reading.

Advantageously, the context data include the reading position and the reading parameters of the step of launching the reading include said position.

Thus, the reading method takes into account the reading position, extracts context data and makes it possible to adapt the start of the reading of the multimedia content to this context datum. Moreover, the step of identification makes it possible to carry out this adaptation at the scale of a user.

Preferably, the step of identification is carried out on a plurality of users, the step of selection is carried out by a user of the plurality of users, the identified plurality of users is added to the list of watching users and the reading parameters of the step of launching the reading depend on the context data associated with the plurality of identified users and contained in the table of users.

Thus, it is possible to ensure multi-user management through a multi-user session.

Advantageously, the context data include the reading position, the reading parameters include said reading position; and the step of launching is preceded by:
- a step of comparing the reading position of each user of the plurality of users with the reading position of the other users of the plurality of users;
- when the reading position is identical for all the users, a step of initialisation of the reading position to the value of the reading position common to all of the users.

Advantageously, when at least one user has a reading position different from the other users of the plurality of users, the reading method includes:
- a step of displaying a menu making it possible to select a reading position among the set of reading positions of the plurality of users;
- a step of initialisation of the reading position to the selected value.

Thus, the reading method takes into account the reading position during a multi-user session. This management of a multi-user session is only made possible by the use of the table of users used during the step of launching the reading and by the step of identification of the plurality of users.

Advantageously, the reading method includes a second step of identification of users during the reading of the multimedia content, said second step being repeated at regular intervals during the reading.

Thus, users viewing the multimedia content are identified regularly and a change in the identity of these users may be detected and taken into account by the reading method. In other words, when one or more users arrive while a multimedia content is in the course of being read, the latter are identified during the occurrence of the second detection step following their arrival. Similarly, when a user was present during the preceding second identification step but when the latter is no longer present during the next occurrence of said second step, then the latter is identified as being no longer in the course of reading. The method could thus manage in a dynamic manner the departure and the arrival of new users.

Advantageously, the method includes, when a user identified during the second identification step is not in the list of watching users:
- a step of displaying a menu enabling the identified user to conserve the reading position contained in the table of users or to re-initialise this reading position to the value of the current reading position;
- when the identified user choses to re-initialise the reading position, a step of adding the user to the table of watching users.

Current reading position is taken to mean the reading position at the considered instant. For example, when the current reading position during the step of identification is considered, the value of the current reading position is equal to the reading position at the moment when the identification step is implemented.

Alternatively, the method includes, when a user identified during the second identification step is not in the list of watching users:
- a step of verification of the deletion request datum relating to the identified user and contained in the table of users relating to the multimedia content being read;
- when the user has not requested the deletion of the content being read, a step of verification of the reading position contained in the table of users relating to the multimedia content being read;
- when this reading position is prior to the current reading position:
  - a first sub-step of displaying a menu enabling the user to conserve the reading position contained in the table of users or to re-initialise this reading position to the value of the current reading position;
  - when the user chooses to re-initialise the reading position, a second sub-step of adding the user to the table of watching users.

Advantageously, the method includes, when the reading position of the identified user is later than the current reading position:
- a first sub-step of initialisation of the reading position of the user to the value of the current reading position;
- a second sub-step of adding the user to the table of watching users.

Preferably, the method includes, when a user of the table of watching users is not identified during the second identification step:
- a first step of updating the reading position of said user, said reading position being re-initialised to the reading position of the multimedia content during the second identification step;
- a second step of deleting the user from the table of watching users.

Thus, the context data are updated as a function of the departure and the arrival of users.

Advantageously, the reading method includes
a step of stopping the reading;
a step of re-initialisation of the reading position for the users of the table of watching users, the reading position being re-initialised to a value equal to the reading position at the moment of the stopping of the reading.

Advantageously, the step of re-initialisation of the reading position is followed by a step of modification of the allocated space, the allocated space thereby modified only conserving the part of the multimedia content situated from the lowest reading position among the reading positions of the table of users associated with said multimedia content.

Thus, storage space is optimised by deleting the part of the multimedia content that all of the users of the table of users associated with said multimedia content have already seen.

In an alternative or complementary manner, the step of re-initialisation of the reading position is followed:
by a step of inputting, by a user among the watching users, a first reading position, called actual start position, and a second reading position, called actual end position;
by a step of modification of the allocated space, the allocated space thereby modified only conserving the part of the multimedia content situated between the actual start position and the actual end position.

Thus, when the recording of the multimedia content has started whereas the event of interest has not started or instead when the recording has continued whereas the event of interest itself had ended, the allocated space is modified so as to only conserve the part of the multimedia content concerning the event of interest.

Advantageously, when the space allocated to the multimedia content is modified, the method further includes, at the end of this modification step, a step of modification of the reading positions contained in the user table associated with said multimedia content so as to take into account said modification.

A fourth aspect of the invention relates to an electronic device comprising a database containing a list of users and a table of recordings, a calculation means, an acquisition means and a storage means, the device being configured to implement a method according to a first, a second or a third aspect of the invention.

A fifth aspect of the invention relates to a computer programme product including instructions which lead the device according to a fourth aspect of the invention to execute the steps of the method according to the first, second or third aspects of the invention.

A sixth aspect of the invention relates to a support that can be read by a computer, on which is recorded the computer programme according to a fifth aspect of the invention.

The invention and its different applications will be better understood on reading the description that follows and by examining the figures that accompany it.

BRIEF DESCRIPTION OF THE FIGURES

The figures are presented for indicative purposes and in no way limit the invention.

DETAILED DESCRIPTION OF AT LEAST ONE EMBODIMENT OF THE INVENTION

Unless stated otherwise, a same element appearing in the different figures has a single reference.

Figure 1:
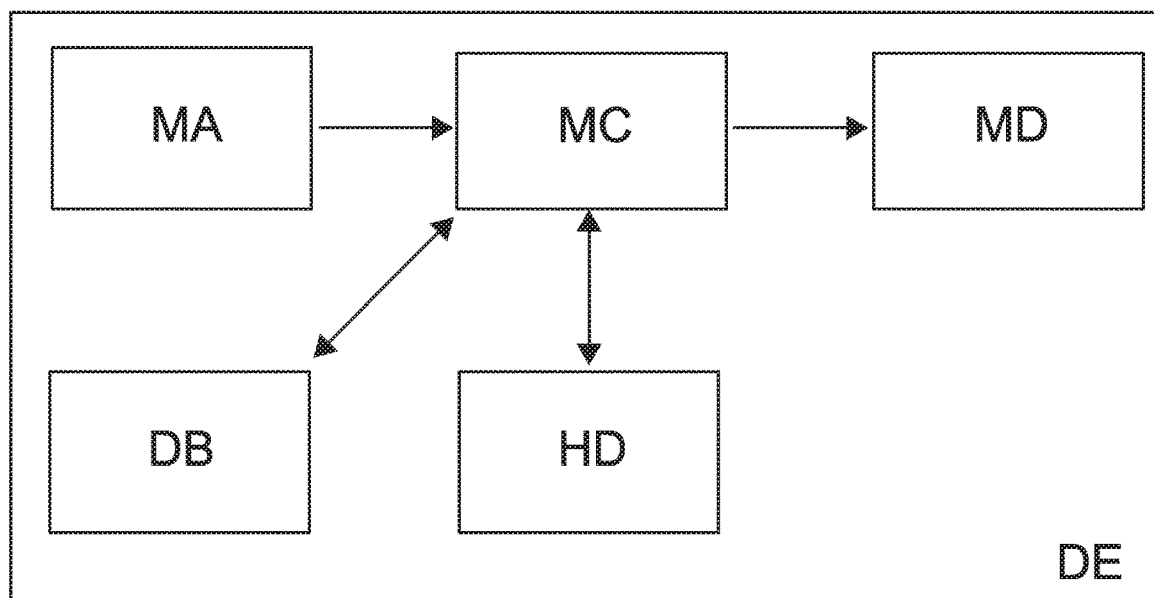
FIG. 1 shows a schematic representation of an electronic device according to an embodiment of the invention.
Figure 2:
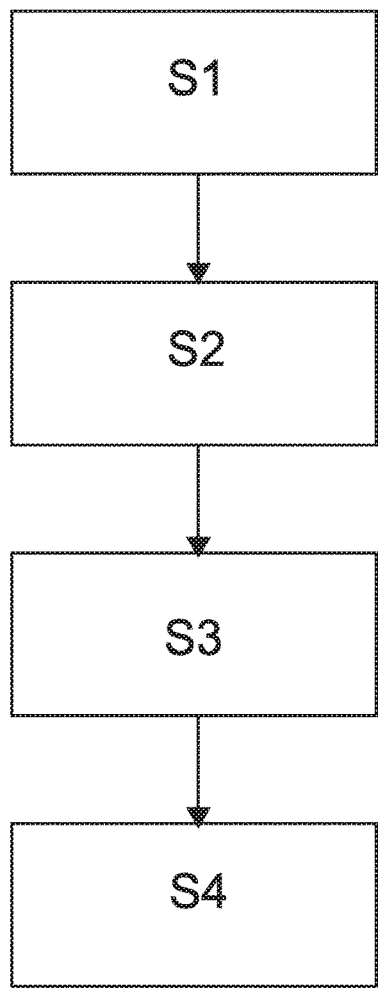
FIG. 2 shows a flow chart of a storage method according to a first aspect of the invention.
Figure 3:
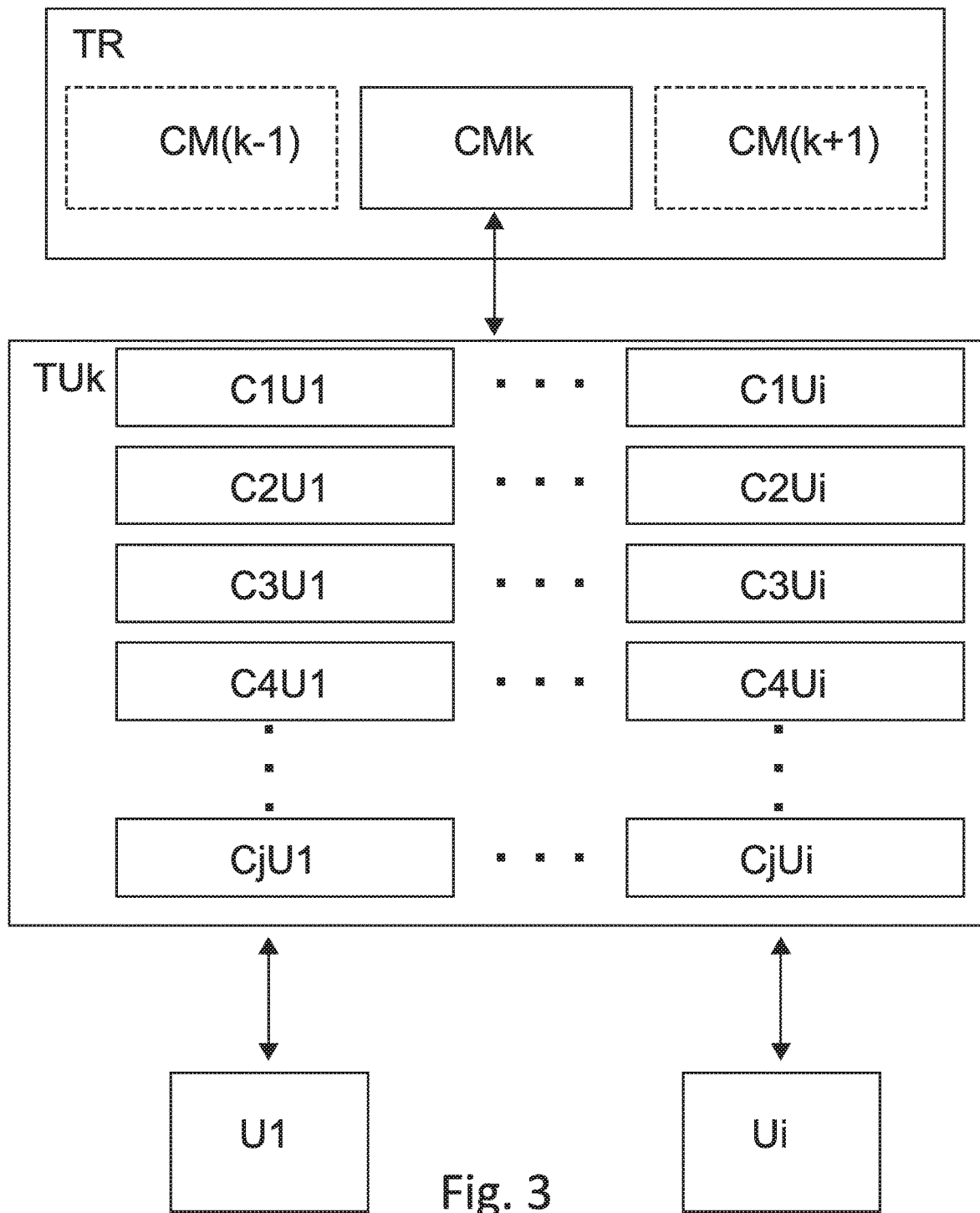
FIG. 3 illustrates the relation between users, a multimedia content and a user table containing the context data according to an embodiment of the invention.

A first aspect of the invention illustrated in FIGS. 1 to 3 relates to a method for storing a multimedia content CMk implemented by an electronic device DE. The electronic device DE may for example consist of a set-top box device. The electronic device DE includes a database DB containing a list of users Ui and a table of recordings TR. The database may for example take the form of a SQL or instead NOSQL type database.

The device also comprises a means for acquiring MA the multimedia content CMk. This acquisition may for example be done through a data acquisition board or instead by a connection to a computer network. The electronic device may also include a calculation means MC, for example a processor or instead a programmable logic circuit (or FPGA for Field Programmable Gate Array). The calculation means MC may be associated with a memory containing a computer programme including instructions that lead the electronic device DE to execute the steps of the method for storing a multimedia content CMk (but also a method for managing a storage space or a method for a multimedia content CMk such as they will be described hereafter). The device also includes a storage means HD, for example a hard disc or a Cloud storage means. The electronic device DE may also comprise a broadcasting means MD making it possible to broadcast a multimedia content CMk recorded beforehand on a display means. This broadcasting means MD may for example take the form of a graphics chip comprising an output port in order to be connected to a display means such as a screen. The broadcasting means MD may also take the form of a network connection broadcasting the multimedia content CMk, the latter then being broadcast on remote terminals such as smartphones or digital tablets.

The calculation means MC is able to extract data from the database DB or instead to record data in said database DB. The calculation means MC is also able to read or write data on the storage means HD or instead broadcast a multimedia content CMk stored on the storage means HD through broadcasting means MD. The calculation means MC is also able to write to memory a multimedia content CMk acquired by the acquisition means MA in an allocated storage space on the storage means HD.

Generally speaking, the steps of acquisition and writing to memory are carried out simultaneously, the multimedia content CMk being written to memory as the acquisition proceeds.

In a first embodiment, the storage method according to a first aspect of the invention includes a first step S1 of allocating a storage space on the storage means HD by the calculation means MC. The method also includes a second step S2 of adding the multimedia content CMk to the table of recordings TR. The method further includes a third step S3 of acquisition and writing to memory of the multimedia content CMk in the allocated space. During this step, the multimedia content is thus written to memory as its acquisition proceeds and the processes of acquisition and writing to memory are thus simultaneous. In addition, the method includes a fourth step S4 of creation of a table of users TUk relating to the stored multimedia content CMk. The table of users TUk includes, for each user Ui of a sub-set of the list of users contained in the database DB, one or more context data CjUi.

The sub-set of the list of users may include a part at least of the users Ui contained in the database DB. Alternatively, the sub-set may include all the users Ui contained in the database DB. For example, the sub-set may contain all the users Ui above a certain age to take account of the specificity of a multimedia content CMk. In this case, the database DB also comprises for each user Ui a datum concerning the age of said user Ui.

The context data CjUi may concern several aspects of the multimedia content CMk. These context data CjUi provide a context adapted to each multimedia content CMk of the table of recordings TR and do so for each user Ui. In other words, each multimedia content CMk of the table of recordings TR is associated with a table of users TUk. This table of users TUk includes, for each user Ui, context data CjUi and thus makes it possible to associate for each multimedia content CMk, a user Ui with context data CjUi. It is thereby possible to personalise the context data CjUi associated with a multimedia content CMk for each user Ui.

In an embodiment, the context data CjUi include, for each user Ui, a first context datum C1Ui relating to the position of reading the multimedia content, called reading position. As will be shown hereafter, this context datum C1Ui notably makes it possible to adapt the reading position to the user Ui.

In an embodiment, the context data CjUi include a second context datum C2Ui relating to the recording request, called recording request datum, indicating if the user Ui has requested the recording of the multimedia content CMk. In an embodiment, the context data CjUi include a third context datum C3Ui relating to the deletion request, called deletion request datum, indicating if the user Ui has requested the deletion of the multimedia content CMk. In an embodiment, the context data CjUi include a fourth context datum C4Ui relating to the locking request, called locking request datum, indicating if the user Ui has requested the locking of the multimedia content CMk. As will be shown hereafter, these context data CjUi make it possible to manage in an efficient manner the storage space while taking into account the different interactions between the different users Ui.

In an embodiment, the initialisation of the first C1Ui, second C2Ui, third C3Ui and/or fourth C4Ui context data of said table TUk takes place during the second step S2 of adding an entry relating to the multimedia content CMk in the table of recordings TR. For example, the reading position C1Ui is initialised to zero, that is to say at the start of the multimedia content CMk.

In an embodiment, the recording request datum C2Ui, the deletion request datum C3Ui and the locking request datum C4Ui are Boolean data, said Boolean data being initialised to the value "No".

In an embodiment, when one or more users Ui are currently viewing the multimedia content CMk during the step of acquisition and writing to memory of said multimedia content CMk in the allocated storage space HD, the method includes, when the viewing ends, for example on request of a user Ui, a step of updating the context data of said user or users Ui in table of users TUk associated with the viewed multimedia content CMk. In other words, when one or more users Ui of the plurality of users is currently viewing the multimedia content CMk moreover being recorded, the context data CjUi of said user or users Ui are adapted as a consequence. For example, the reading position could be initialised as a function of the reading position during the stopping of the viewing. Thus, the context data of the user Ui concerning the multimedia content CMk will take into account the fact that the user or the users Ui have already viewed at least a part of said multimedia content CMk.

In an embodiment, the table of recordings TR includes, for each multimedia content CMk, the name of the multimedia content CMk, the origin of the multimedia content CMk, the date and time of broadcasting the multimedia content CMk, the duration of the multimedia content CMk, the status of the multimedia content CMk as well as a link to the memory of the storage means HD containing the multimedia content CMk. These different data may be updated during the step S3 of acquisition and writing to memory, for example to take into account the evolution of the duration of the multimedia content CMk in the course of acquisition and writing to memory.

In an embodiment, the list of users includes, for each user Ui, one or more data corresponding to communication means enabling an exchange with said user Ui. These data may for example include a telephone number, an email address and/or a user name of a social network or several social networks. This information may then be used in order to communicate useful information associated with each multimedia content to each user Ui. These data may be input at the creation of each user Ui or be updated after said creation. In this case, the electronic device DE includes means for, from this information, communicating with the users Ui contained in the list of users.

In an exemplary embodiment, the database DB comprises a list of three users: a first user U1, a second user U2 and a third user U3. In this example of use, the first user U1 has requested the recording of the multimedia content CM1. Once the recording has started, that is to say at the end of the first step of allocating a storage space on the storage means, an entry is created in the table of recordings in order to add the multimedia content CM1 to said table. Such an entry is illustrated in table 1. The latter includes the name of the multimedia content, the origin of the multimedia content, the date and time of broadcasting the multimedia content, the duration of the multimedia content, the status of the multimedia content as well as a link to the memory space of the storage means containing the multimedia content, here present in the form of a link to a file. The recording, or in other words the step S3 of acquisition and writing to memory, being in progress, the datum relating to the state here takes the value "In progress".

TABLE 1

| Name | Origin | Date and time | Duration | Status | Memory space |
|---|---|---|---|---|---|
| CM1 | Channel 1 | yy-mm-dd hh-mm | hh:mm:ss | "In progress" | File |

Once the multimedia content CM1 has been added to the table of recordings, a table of users including context data associated with each user for said multimedia content CM1 is created and initialised. The context data CjUi include a context datum relating to a reading position, a context datum relating to a deletion request and a context datum relating to a locking request. At the end of step S3 of acquisition and writing to memory of the multimedia content CMk, it is possible to carry out an updating of the data concerning the multimedia content CMk in the table of recordings TR, for example by modifying the status from the value "In progress" to the value "Ended". Such an exemplary embodiment is illustrated in table 2. It is further possible to carry out such an update in the course of step S3 of acquisition and writing to memory as has already been specified previously.

TABLE 2

| Name | Origin | Date and time | Duration | Status | Memory space |
|---|---|---|---|---|---|
| CM1 | Channel 1 | yy-mm-dd hh-mm | hh:mm:ss | "Ended" | File |

As explained previously, a table of users TU1 has been created and contains the context data CjUi. In this exemplary embodiment, all the users Ui of the database DB are present in the table of users TU1 relating to the multimedia content CM1. The table of users TU1 is illustrated in table 3.

TABLE 3

| User | Recording request | Reading position | Deletion request | Locking request |
|---|---|---|---|---|
| U1 | Yes | 00:00:00 | No | No |
| U2 | No | 00:00:00 | No | No |
| U3 | No | 00:00:00 | No | No |

In the table of users TU1 of table 3, the recording request datum C2Ui is initialised to "Yes" for the first user U1, the latter having requested the recording and to "No" for the second user U2 and the third user U3, said users not having requested the recording. None of the users Ui yet having viewed the multimedia content CM1, the reading position C1Ui is initialised to "00:00:00". Similarly, no user Ui having requested the deletion or the locking of the multimedia content CM1, the corresponding context data C3Ui, C4Ui are initialised to "No". This is only an exemplary embodiment of a method according to a first aspect of the invention. Indeed it is possible to envisage the presence of additional context data CjUi such as the language of the sub-titles or instead the sound volume. The context data may be initialised to a default value, for example by means of a user profile created beforehand by each user and specifying the default value to take for each context datum or for only a part of them. It is also possible to envisage other choices concerning the initialisation of the context data CjUi.

The multimedia content CMk recorded using the method according to a first aspect of the invention occupies a storage space which can sometimes be difficult to manage, the interactions between the different users Ui being able to be numerous. However, the storage method according to a first aspect of the invention, in associating with each multimedia content CMk a table of users TUk and with each table of users TUk a single multimedia content CMk, makes it possible to facilitate the management of the storage space.

Figure 4:
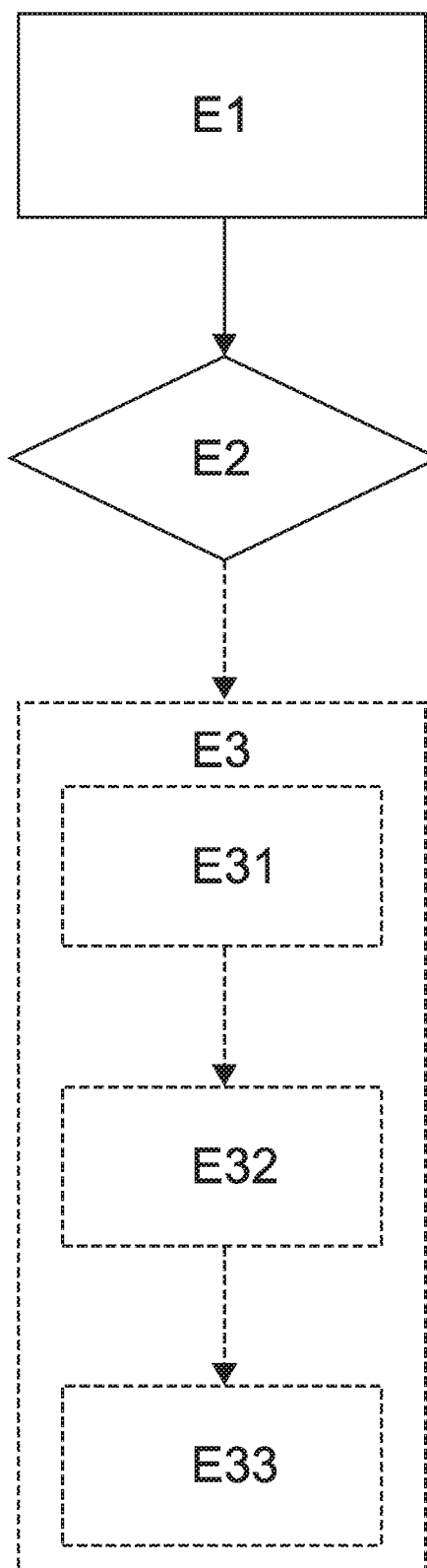
FIG. 4 shows a flow chart of a first embodiment of a method for managing storage space according to a second aspect of the invention.

To do so, a second aspect of the invention relates to a method for managing a storage space, the storage space comprising at least one multimedia content CMk recorded using a storage method according to a first aspect of the invention. More specifically, in an embodiment illustrated in FIG. 4, the method for managing a storage space includes a step E1 of inputting an order to delete a multimedia content CMk. This inputting step may be carried out by selection of the multimedia content CMk to delete in a list of multimedia contents CMk, said list being generated as a function of the context data CjUi associated with each multimedia content CMk. The method further includes a step E2 of analysing the context data CjUi of the table of users TUk associated with said multimedia content CMk. The method also includes a step E3 of actual deletion of the multimedia content CMk, said deletion being conditioned by the step E2 of analysing the context data CjUi.

The storage management method according to the invention thus analyses the context data CjUi of a multimedia content CMk before potentially carrying out the deletion. The step E3 thus is still not implemented and its execution depends on the value of the context data CjUi associated with the multimedia content CMk.

In an embodiment, the actual deletion step E3 includes:
- a first sub-step E31 of freeing the storage space allocated to the multimedia content CMk;
- a second sub-step E32 of deleting the user table TUk associated with the multimedia content CMk;
- a third sub-step E33 of deleting the multimedia content CMk from the table of recordings.

Figure 5:
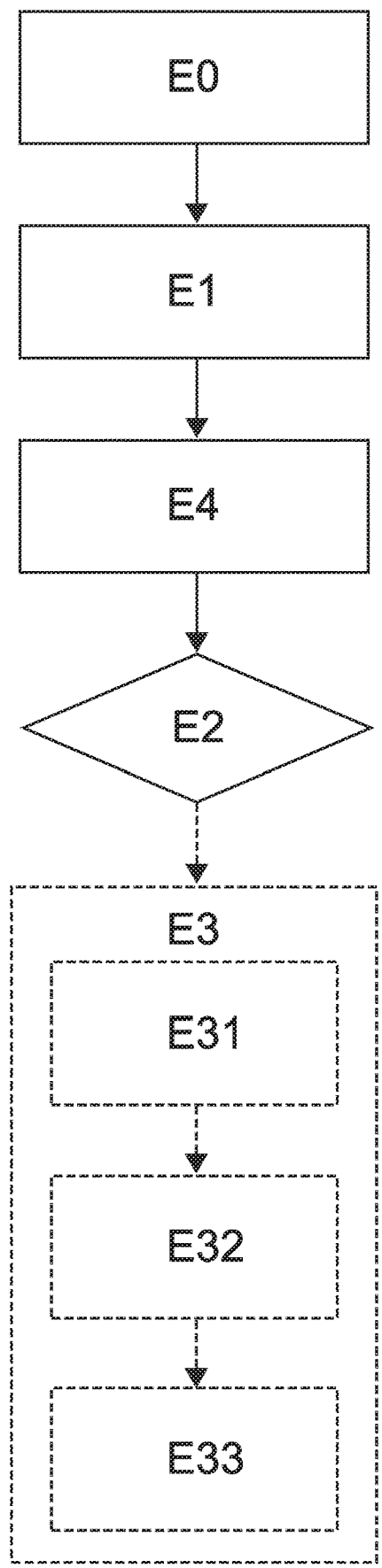
FIG. 5 shows a flow chart of a second embodiment of a method for managing storage space according to a second aspect of the invention.

In a second embodiment illustrated in FIG. 5, the storage space management method according to a second aspect of the invention includes a step E0 of identification of a user Ui. The step E0 of identification of a user Ui may be carried out by a facial recognition method, the electronic device DE then including facial recognition identification means. Alternatively, the user Ui can identify himself by means of a remote control coupled to the electronic device DE, the latter then being equipped with means for receiving instructions coming from said remote control. For example, the remote control may comprise buttons of different colours, each user Ui being associated with a different colour and each user Ui being able to identify himself by pressing on the button that is associated with him. The user may also identify himself by means of a smartphone, the electronic device DE then comprising means for communicating with said smartphone, for example a Bluetooth or Wifi connection means. These are only examples and any other identification means may be envisaged.

The method further includes a step E1 of inputting an order to delete a multimedia content CMk by the identified user Ui. This inputting step may be carried out by selection of a multimedia content CMk in a list of multimedia contents. This list of multimedia contents may be obtained by displaying the multimedia contents CMk of the table of recordings TR for which the identified user Ui has not yet requested the deletion. In other words, the list proposed to the identified user Ui does not comprise all the multimedia content CMk of the table of recordings TR but uniquely the multimedia contents CMk not deleted by the identified user Ui. The context data CjUi are thus also used to generate the list of multimedia contents CMk proposed to the user Ui for the step E1 of inputting a deletion order. The method also includes a step E4 of updating, for the user Ui having input the deletion order, the deletion request datum C3Ui in the table of users TUk relating to the selected multimedia content CMk. The method next implements the step E2 of analysing the context data.

In an embodiment, the step E2 of analysing the context data includes a sub-step of verification, for each of the users Ui of the table of users TUk associated with the multimedia content CMk, the deletion request datum C3Ui in the table of users TUk associated with the multimedia content CMk. When each user Ui of the table of users TUk associated with the multimedia content CMk has requested the deletion of said multimedia content CMk, the method implements the step E3 of actual deletion of said multimedia content CMk.

In this embodiment, the actual deletion of the content CMk is only possible if all the users Ui have made the request to do so. The step E3 is thus still not implemented and its execution depends on the value of the context data CjUi associated with the multimedia content CMk.

In an embodiment, when at least one or more users Ui of the user table TUk associated with the multimedia content CMk have not requested the deletion of said multimedia content CMk, the method includes a step of sending a message to said users in order to remind the latter that said multimedia content CMk is not yet deleted. In an embodiment, the message sent also enables the user Ui receiving said message to request the deletion of said multimedia content CMk. The sending of the message is carried out using the communication data associated with the user Ui in question in the database DB.

In other words, when a user Ui makes a deletion request, the calculation means MC verifies which are the users Ui who have not yet requested deletion or instead requested locking, and sends to each of these users Ui a message asking them to confirm their locking request or asking them if they wish to delete said content. Thus, the users Ui are prompted to delete the multimedia content CMk that they do not intend to view.

In an alternative or complementary embodiment, the message is not sent to the user Ui by the communication means but is directly displayed at the level of a display means. In this embodiment, when a user Ui is identified, the calculation means MC verifies among the multimedia contents CMk stored since a determined period or longer, if the user Ui still has multimedia contents CMk for which he has not requested the deletion or for which he has requested the locking. If such multimedia contents CMk exist, then the message asks the user Ui if he wishes or not to delete said multimedia contents CMk.

In an exemplary embodiment, the table of users TU1 associated with the multimedia content CM1 comprises three users: a first user U1, a second user U2 and a third user U3. Firstly, only the user U3 requires the deletion of the multimedia content CM1. The table of users TU1 associated with the multimedia content CM1 is illustrated in table 4.

TABLE 4

| User | Recording request | Reading position | Deletion request | Locking request |
|------|-------------------|------------------|------------------|-----------------|
| U1   | Yes               | 00:00:00         | No               | No              |
| U2   | No                | 00:00:00         | No               | No              |
| U3   | No                | 00:00:00         | Yes              | No              |

The deletion request datum C3U3 is thus updated to take into account the request of the third user U3 and takes the value "Yes". The first user U1 and the second user U2 not having requested the deletion of the multimedia content CM1, the deletion request data C3U1, C3U2 relating to the first user U1 and to the second user U2 remain at the value "No" and the space allocated to the multimedia content CM1 is not free.

Secondly, the first user U1 and the second user U2 not wishing to view the multimedia content CM1 also request the deletion of this multimedia content CM1. The user table TU1 then comprises the data of table 5.

TABLE 5

| User | Recording request | Reading position | Deletion request | Locking request |
|------|-------------------|------------------|------------------|-----------------|
| U1   | Yes               | 00:00:00         | Yes              | No              |
| U2   | No                | 00:00:00         | Yes              | No              |
| U3   | No                | 00:00:00         | Yes              | No              |

The set of users Ui of the table of users TU1 of the multimedia content CM1 having requested the deletion of the multimedia content CM1, the space allocated to said multimedia content CM1 on the storage means HD is freed, the table of users TU1 associated with this multimedia content CM1 is deleted and the entry corresponding to the multimedia content CM1 in the table of recordings TR is deleted.

This is only an example of implementation of a method according to a second aspect of the invention. It is possible for example to envisage an embodiment in which the deletion request datum C3Ui is modified automatically at the end of the reading of the multimedia content CM1, the value of this context datum then being updated to "Yes". A user Ui could then ensure that the multimedia content CM1 is not deleted by making a locking request, said request modifying the value of the locking request datum C4Ui, the latter being updated to "Yes".

This exemplary embodiment makes it possible to illustrate the management of the different interactions between the users Ui of the system. The latter is greatly facilitated by the presence of the table of users TUk associated with the multimedia content CMk. Moreover, the storage method according to a first aspect of the invention makes it possible, thanks to the presence of a user table TUk for each multimedia content CMk, to implement a method for reading the multimedia content CMk taking into account the interactions between different users Ui.

To do so, a third aspect of the invention relates to a method for reading a multimedia content CMk by an electronic device DE.

Figure 6:
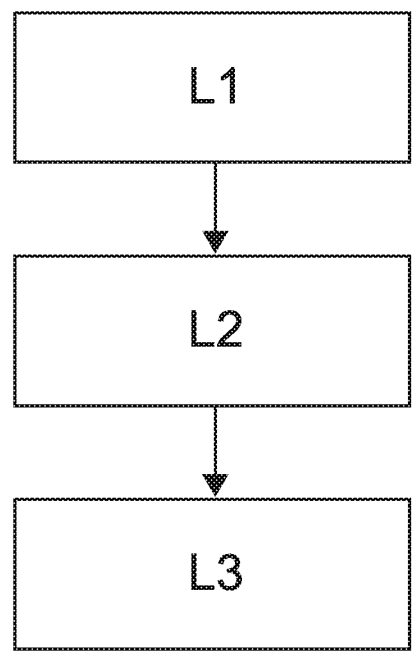
FIG. 6 shows a flow chart of a first embodiment of a reading method according to a third aspect of the invention.

In an embodiment illustrated in FIG. 6, the reading method according to a third aspect of the invention includes a step L1 of identification of a user Ui. As specified previously, this identification step may be carried out by a facial recognition method, the electronic device including facial recognition identification means. Alternatively, the user Ui can identify himself by means of a remote control coupled to the electronic device DE, the latter then being equipped with means for receiving instructions coming from said remote control. The user Ui can also identify himself by means of a smartphone, the electronic device DE then comprising means for communicating with said smartphone, such as for example a Bluetooth or Wifi connection means. These are only examples and any other identification means may be envisaged.

The method further includes a step L2 of selection by the identified user Ui of a multimedia content CMk. This selection step may be carried out by means of a list of multimedia contents CMk. This list of multimedia contents CMk may be obtained by displaying the multimedia contents CMk of the table of the recordings TR that the identified user Ui has not yet viewed or only partially viewed. In other words, the list proposed to the identified user Ui does not comprise all the multimedia contents CMk of the table of recordings TR but only the multimedia contents CMk not yet or only partially viewed by the identified user Ui. For example, this list will not comprise the multimedia contents CMk for which the user Ui has requested the deletion. The context data CjUi are thus also used to generate the list of multimedia contents CMk proposed to the user Ui for the step L2 of selection of a multimedia content CMk. The method further includes a step L3 of launching the reading of the selected multimedia content CMk, the reading parameters depending on the context data CjUi associated with the identified user Ui and contained in the table of users TUk.

Figure 7:
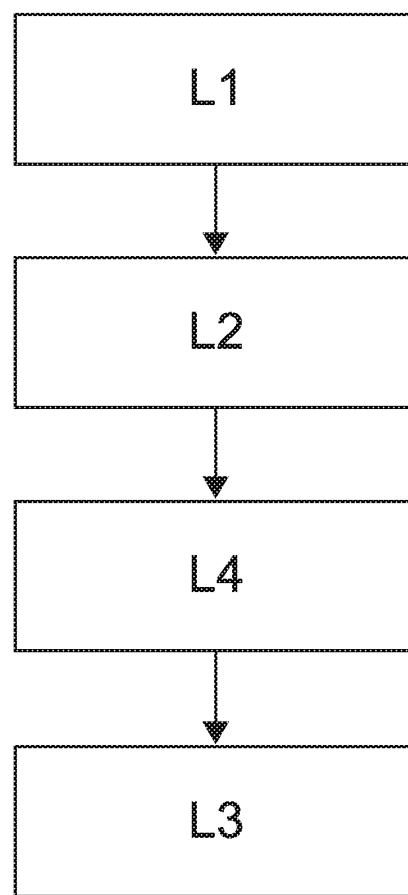
FIG. 7 shows a flow chart of a second embodiment of a reading method according to a third aspect of the invention.

In an embodiment illustrated in FIG. 7, the step L3 of launching the reading is preceded by a step L4 of creation of a table of watching users, the identified user Ui being added to said table of watching users during the creation of said table of watching users.

This reading method thus takes into account the context data CjUi contained in the table of users TUk associated with the multimedia content CMk in order to parameterise said reading of the multimedia content CMk. These context data CjUi may for example be linked to a sub-title language, an audiotape language or instead a sound volume. The context data may be initialised to a value by default, for example by means of a user profile created beforehand by each user and specifying the default value to take for each context datum or for only a part thereof. In an embodiment, the context data CjUi include the reading position C1Ui and the reading parameters include said reading position C1Ui.

In an embodiment, the identified user Ui may signal interesting passages of a multimedia content CMk. More specifically, the method includes a step of inputting, by a user Ui, a point of interest, the point of interest being associated with a reading position of the multimedia content CMk being read. The method may also include a step of transmitting a message including said reading position to the other users Ui. In an embodiment, during the step of inputting a point of interest, the user Ui can also choose the users Ui with whom the information may be shared. In an embodiment, the message is not sent but appears when the users Ui identify themselves or instead when the users Ui view said multimedia content CMk.

In an exemplary embodiment, a multimedia content CM1 is associated with a user table T1, the user table U1 including context data corresponding to a first user U1 and a second user U2. This table of users is illustrated in table 6.

TABLE 6

| User | Recording request | Reading position | Deletion request | Locking request |
|---|---|---|---|---|
| U1 | Yes | 01:44:17 | No | No |
| U2 | No | 00:00:00 | No | No |

The reading position datum C1U1 indicates that the first user U1 has already viewed a part of the multimedia content CM1. Firstly, the first user Ui identifies himself. Secondly, the first user U1 launches the reading of the multimedia content CM1, for example by means of a remote control by selecting the multimedia content CM1 in a list of multimedia contents CMk. The electronic device DE extracts, using the calculation means MC, the reading position C1U1 in the table of users TU1 associated with the multimedia content CM1, for the identified user, that is to say the first user U1. The electronic device DE next launches the reading of the multimedia content CM1, this reading starting at a position corresponding to the reading position C1U1 of the first user, here "01:44:17".

When the second user U2 wishes to view the multimedia content CM1, he proceeds in the same manner. The second user U2 is identified then the latter selects the multimedia content CM1. The electronic device DE extracts, using the calculation means MC, the reading position C1U2 in the user table TU1 associated with the multimedia content CM1, for the identified user, that is to say the second user U2. The reading position C1U2 being zero for the second user U2, the reading of the multimedia content CM1 will begin at the start of said multimedia content CM1. It appears, on reading this example, that two users U1, U2 can manage in a separate manner the context data CjUi relating to a same multimedia content CM1.

However, the users Ui may be brought about to interact. A first user U1 may for example view a first multimedia content CM1 with a second user U2.

In order to deal with this situation, in an embodiment according to a third aspect of the invention, the identification step L1 is carried out on a plurality of users Ui, the selection step L2 is performed by a user Ui of the plurality of users Ui and the reading parameters of the step L3 of launching the reading depend on the context data CjUi associated with the plurality of identified users Ui and contained in the table of users TUk.

Figure 8:
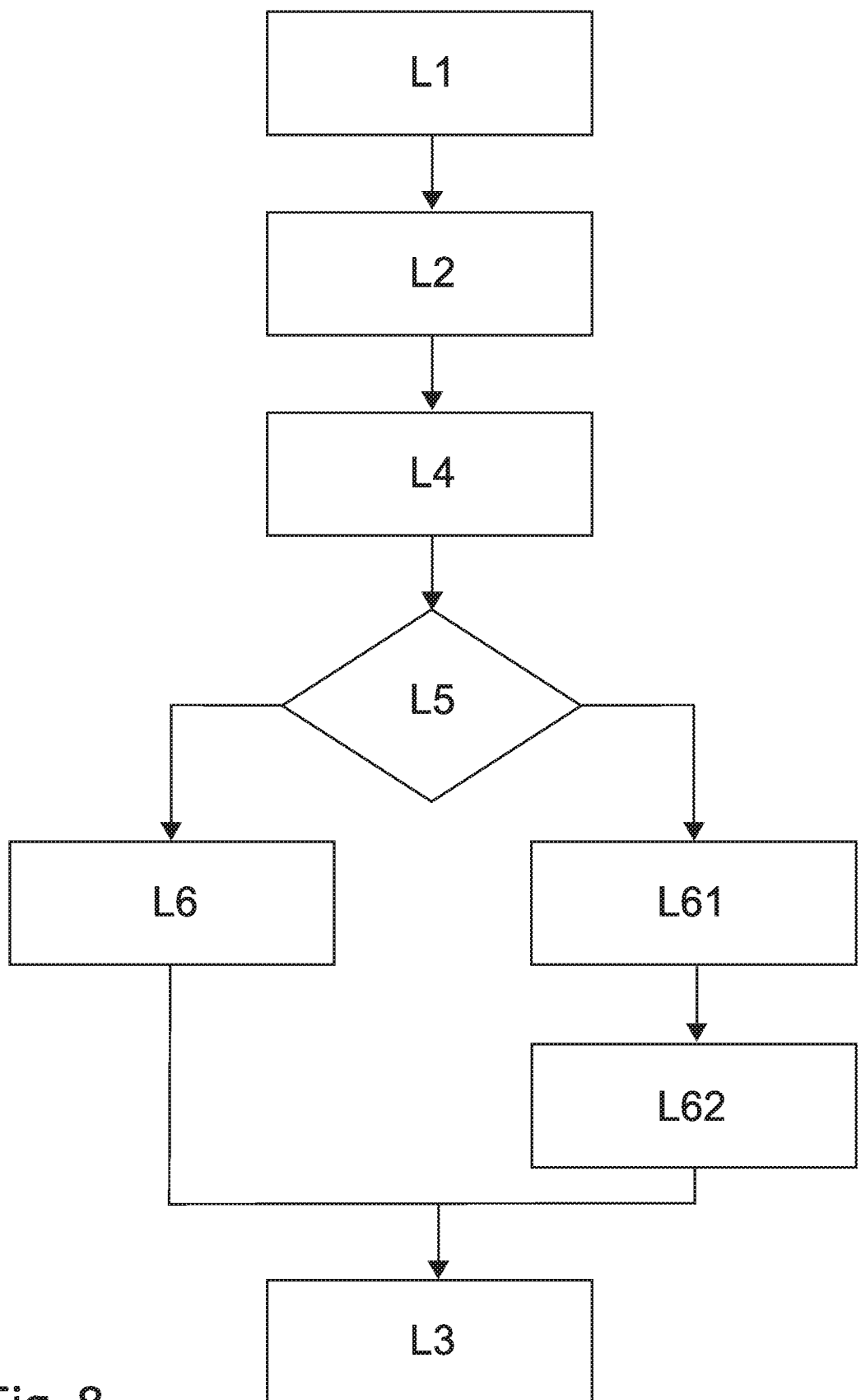
FIG. 8 shows a flow chart of a third embodiment of a reading method according to a third aspect of the invention.

In an embodiment illustrated in FIG. 8, the reading method includes, before the step L3 of launching the reading, a step L5 of comparing the reading position of each user Ui of the plurality of users Ui with the reading position of the other users Ui of the plurality of users Ui. When the reading position C1Ui is identical for all the users Ui, the method includes, between the step L5 of comparing the reading position and the step L3 of launching the reading, a step L6 of initialising the reading position to the value of the reading position common to all of the users Ui.

In an embodiment, when at least one user Ui has a reading position C1Ui different from the other users Ui of the plurality of users Ui, the method includes, between the step L5 of comparing the reading position and the step L3 of launching the reading:
  a step L61 of displaying a menu making it possible to select a reading position among the set of reading positions of the plurality of users Ui;
  a step L62 of initialisation of the reading position to the selected value.

In an exemplary embodiment, the table of users TU1 of a first multimedia content CM1 is given in table 7.

TABLE 7

| User | Recording request | Reading position | Deletion request | Locking request |
|---|---|---|---|---|
| U1 | Yes | 01:14:17 | No | No |
| U2 | No | 00:00:00 | No | No |
| U3 | No | 00:00:00 | No | No |

This table of users TU1 contains the context data of a first user U1, of a second user U2 and of a third user U3. In this exemplary embodiment, the first user U1 and the second user U2 viewing the multimedia content CM1 together, the identification step L1 is thus carried out on the first user U1 and the second user U2. The selection step L2 is carried out by the first user U1 or the second user U2 and the reading parameters of the step L3 of launching the reading are then a function of the context data CjU1 associated with the first user U1 and the context data CjU2 associated with the second user U2.

More specifically, the context data CjUi include the reading position C1Ui and the reading parameters include the reading position C1Ui. The first user U1 and the second user U2 having been identified, the reading method implements a step L5 of comparison between the reading position of the first user U1 and the reading position of the second user U2.

As illustrated in table 7, the reading position C1U1 of the first user U1 is different from the reading position datum C1U2 of the second user U2. The reading method thus implements a step L61 of displaying a menu making it possible to select a reading position among the reading position of the first user U1 and the reading position of the second user U2. The selection of the reading position is carried out by one of the two users U1, U2. For example, the first user U1 may choose to select the reading position of the second user U2. In this case, the method implements a step L62 of initialisation of the reading position to the value of the reading position of the user U2, in other words, the reading begins at the start of the multimedia content CM1, the reading position datum of the second user U2 being equal to "00:00:00".

Figure 9:
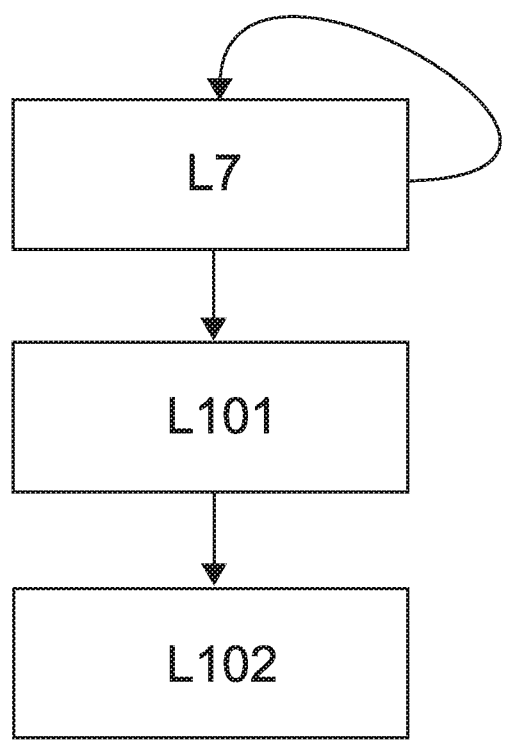
FIG. 9 shows a flow chart of a fourth embodiment of a reading method according to a third aspect of the invention.

In an embodiment illustrated in FIG. 9, the reading method includes a second step L7 of identification of the users Ui during the reading of the multimedia content CMk, said second step L7 being repeated at regular intervals during the reading. This interval may last one second for example and the second identification step L7 is thus carried out every second. In an embodiment, the value of this interval can be parameterised. In this embodiment, the identification means may be configured to detect the presence of new users.

In an embodiment, the reading method includes, when a user Ui identified during step L7 is not in the table of watching users:
- a first sub-step L101 of displaying a menu enabling the user Ui to conserve the reading position C1Ui associated with said user Ui in the user table TUk or to re-initialise this reading position C1Ui to the value of the current reading position;
- when the user Ui chooses to re-initialise the reading position C1Ui, a second sub-step L102 of adding the user Ui to the table of watching users.

Figure 10:
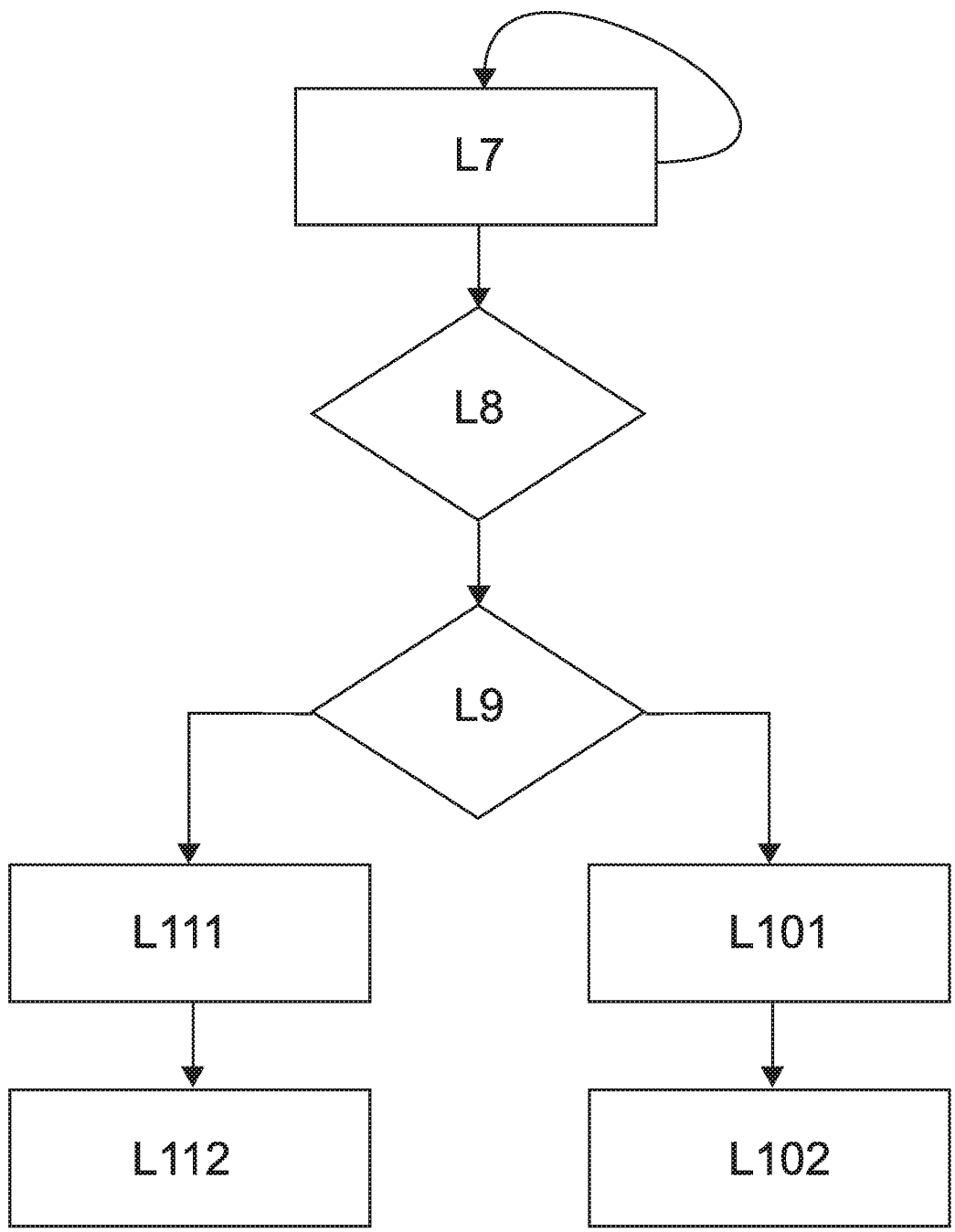
FIG. 10 shows a flow chart of a fifth embodiment of a reading method according to a third aspect of the invention.

In an embodiment illustrated in FIG. 10, the reading method includes, when a user Ui identified during step L7 is not in the list of watching users, a step L8 of verification of the deletion request datum C3Ui relating to the user Ui contained in the table of users TUk relating to the multimedia content CMk being read. As specified previously, the identification means is configured to detect the presence of new users such that the display sub-step L101 is only carried out once for each new user Ui. In other words, once a new user Ui has been detected and has been proposed the selection menu, this menu will no longer be proposed to him at the following occurrences of the second identification step L7.

In this embodiment, when the user Ui has not requested the deletion of the multimedia content CMk being read, the method includes a step L9 of verification of the reading position datum C1Ui contained in the table of users TUk relating to the multimedia content CMk being read. When this reading position is prior to the current reading position, the method includes:
- a first sub-step L101 of displaying a menu enabling the user Ui to conserve the reading position C1Ui associated with said user in the user table TUk or to re-initialise this reading position C1Ui to the value of the current reading position;
- when the user Ui chooses to re-initialise the reading position C1Ui, a second sub-step L102 of adding the user Ui to the table of watching users.

In an embodiment, when this reading position is later than the current reading position, the method includes:
- a first sub-step L111 of initialisation of the reading position of the user Ui to the value of the current reading position;
- a second sub-step L112 of adding the user Ui to the table of watching users.

In an exemplary embodiment, the table of users TU1 of a first multimedia content CM1 is given in table 8.

TABLE 8

| User | Recording request | Reading position | Deletion request | Locking request |
|---|---|---|---|---|
| U1 | Yes | 00:34:17 | No | No |
| U2 | No | 00:00:00 | No | No |
| U3 | No | 00:00:00 | No | No |

In this exemplary embodiment, the user U1 has already viewed a part of the multimedia content CM1. Moreover, the users U2 and U3 are currently viewing and the reading position at the instant where the first user U1 joins them is equal to "00:28:20", that is to say less than the reading position associated with the reading position datum C1U1 contained in the context data of the table of users TU1. When the first user U1 is in his turn identified during the second identification step L7, said user not being in the list of watching users, the deletion request datum associated with the user U1 in the user table TU1 is verified during the verification step L8. Here, the deletion request datum is equal to "No". The method thus proceeds to a step L9 of verification of the reading position datum C1U1 of the user U1 in the user table TU1. The reading position of the user U1 being later than the current reading position, the reading method initialises the reading position of the user U1 in the user table U1 to the current reading position. Moreover, the user U1 is also added to the table of watching users TR.

Figure 11:
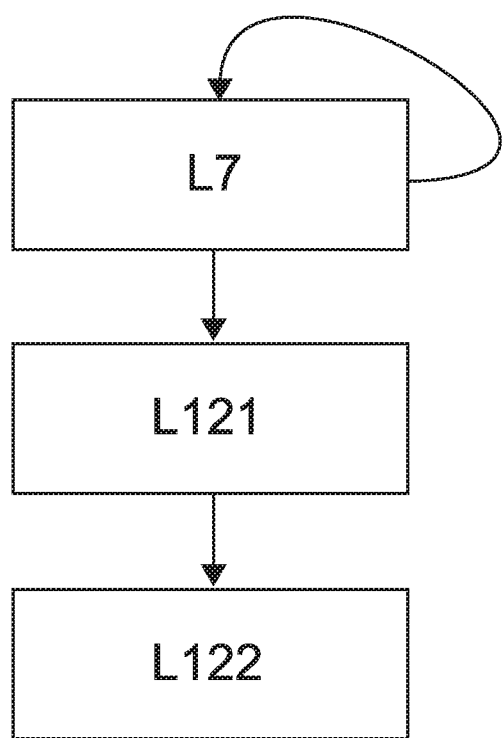
FIG. 11 shows a flow chart of a sixth embodiment of a reading method according to a third aspect of the invention.

In an embodiment illustrated in FIG. 11, when a user Ui present in the list of watching users is not identified during the second identification step L7, the method includes:
- a first sub-step L121 of updating the reading position C1Ui of said user Ui, said reading position C1Ui being re-initialised to the reading position of the multimedia content CMk at the instant where the second identification step is implemented;
- a second sub-step L122 of deleting the user Ui from the table of watching users.

In an embodiment according to a third aspect of the invention, the reading method includes a step of stopping the reading and a step of re-initialisation of the reading position C1Ui for the users Ui of the table of watching users, the reading position C1Ui being re-initialised to a value equal to the reading position at the moment of stopping the reading.

In an exemplary embodiment, the table of users TU1 of a first multimedia content CM1 is given in table 9.

TABLE 9

| User | Recording request | Reading position | Deletion request | Locking request |
|---|---|---|---|---|
| U1 | Yes | 00:34:17 | No | No |
| U2 | No | 00:00:00 | No | No |
| U3 | No | 00:00:00 | No | No |

In this exemplary embodiment, the user U1 has already viewed a part of the multimedia content CM1. Moreover the second user U2 and the third user U3 are currently viewing and are present in the table of watching users. The reading position at the instant where the user U3 stops viewing is equal to "00:28:20". The third user U3 being present in the list of watching users but not being identified since no longer watching the multimedia content, the reading method updates the reading position C1U3 of the third user U3 to a value equal to the reading position of the multimedia content CM1 at the instant when the absence of the third user U3 has been observed. In the case where the second identification step is repeated every second, the reading position C1U3 of the third user U3 is thus updated to "00:28:20". The reading method also deletes the third user U3 from the table of watching users. At the end of these steps, the user table TU1 is such as presented in table 10.

TABLE 10

| User | Recording request | Reading position | Deletion request | Locking request |
|---|---|---|---|---|
| U1 | Yes | 00:34:17 | No | No |
| U2 | No | 00:00:00 | No | No |
| U3 | No | 00:28:20 | No | No |

Secondly, the second user ends the reading of the multimedia content M1. The reading position at the instant when the user U2 ends the reading method is equal to "00:48:10". The reading position is thus re-initialised to a value equal to the reading position at the moment of stopping the reading, that is to say "00:48:10". At the end of stopping the reading, the user table TU1 associated with the multimedia content CM1 is such as illustrated in table 11.

TABLE 11

| User | Recording request | Reading position | Deletion request | Locking request |
|---|---|---|---|---|
| U1 | Yes | 00:34:17 | No | No |
| U2 | No | 00:48:10 | No | No |
| U3 | No | 00:28:20 | No | No |

This exemplary embodiment makes it possible to understand how the reading method according to a third aspect of the invention makes it possible to manage dynamically a multiuser viewing session.

In order to optimise the space occupied by the different multimedia contents CMk, it is also possible to analyse the readings carried out by the users Ui. Indeed, a multimedia content CMk comprises an initial reading position corresponding to the zero time of said multimedia content CMk and a final reading position corresponding to the duration of said multimedia content CMk. These two reading positions correspond to the two memory ends of the storage space allocated to said multimedia content. Yet, it is possible that the event that a user wishes to record has not yet begun at the start of the step of acquisition and storing to memory or instead that it has terminated before the end of this step of acquisition and storing to memory. The multimedia content then occupies a larger memory space than is necessary, the start and end of the multimedia content not corresponding to the event interesting the user. It is thus important to be able to limit memory space allocated unnecessarily.

To do so, the step of re-initialisation of the reading position C1Ui may be followed by a step of modification of the allocated space. This modification is then made as a function of the context data CjUi contained in the table of users TUk and notably the reading position C1Ui associated with each user Ui in this table. More specifically, the allocated space is modified so as to only conserve the part of the multimedia content CMk situated from the lowest reading position C1Ui among the reading positions of the table of users TUk associated with said multimedia content CMk. In the exemplary embodiment illustrated in table 11, at the end of the step of re-initialisation of the reading position, the multimedia content is modified so as to only conserve the part of the multimedia content situated after the lowest reading position C1Ui, here that of user U3 equal to 00:28:20. In an embodiment, the reading positions CiUj are next adapted in order to take into account the modification of the multimedia content CMk. At the end of this modification of the multimedia content, the user table then corresponds to the table 12.

TABLE 12

| User | Recording request | Reading position | Deletion request | Locking request |
|---|---|---|---|---|
| U1 | Yes | 00:05:57 | No | No |
| U2 | No | 00:19:50 | No | No |
| U3 | No | 00:00:00 | No | No |

The new reading positions C1Ui of the users Ui then relate to the modified multimedia content CMk. Obviously, such an operation, which may be optional, is made for example the object of an option in a menu that the user Ui can parameterise. More generally, any context datum CjUi linked to the reading position, for example an important moment selected by the user Ui, is also adapted as a function of the modification of the space allocated to the multimedia content CMk.

In an embodiment, the information concerning the part of the multimedia content CMk relating to the event of interest may be defined by the user. To do so, the step of re-initialisation of the reading position is followed by a step of inputting, by a user Ui among the watching users, a first reading position, called actual start position, and a second reading position, called actual end position. Then, a step of modification of the allocated space is implemented, the space thereby modified only conserving the part of the multimedia content CMk situated between the actual start position and the actual end position.

As explained previously, the new reading positions of the users are then adapted to the modified multimedia content. Obviously, as previously, such an operation may be optional and is made for example the object of an option in a menu that a user can parameterise. Once again, more generally, any context datum linked to the reading position, for example an important moment selected by the user, is also adapted as a function of the modification of the space allocated to the multimedia content CMk.

As explained previously, these two embodiments make it possible to limit the memory occupation of a multimedia content CMk on the storage space HD to the occupation that is strictly necessary for the actual multimedia content CMk.

The invention claimed is:

1. A storage method for storing at least one individual multimedia content by an electronic device, said electronic device comprising a database containing a list of users and a table of recorded individual multimedia contents, a system adapted to acquire the individual multimedia content, a calculation system and a storage system, said storage method including, for each stored individual multimedia content:
　allocating a storage space on the storage system by the calculation system;
　adding an entry relating to the individual multimedia content stored in the table of recorded individual multimedia contents;
　acquiring the individual multimedia content and writing to memory said individual multimedia content in the allocated storage space, and
　creating a table of users relating to the stored individual multimedia content, said table of users including, for each user of a sub-set of the list of users contained in the database, one or more context data.

2. The storage method according to claim 1, wherein the table of users includes, for each user:
　a first context datum relating to the reading position of the individual multimedia content, the first context datum corresponding to a reading position datum; and/or
　a second context datum relating to the recording request, the second context datum corresponding to a recording request datum, indicating if the user has requested the recording of the individual multimedia content; and/or
　a third context datum relating to the deletion request, the third context datum corresponding to a deletion request datum, indicating if the user has requested the deletion of the individual multimedia content; and/or
　a fourth context datum relating to the locking request, the fourth context datum corresponding to a locking request datum, indicating if the user has requested the locking of the individual multimedia content;
the creating of the user table and the initialisation of the first, second, third and/or fourth context data of said table being implemented during the adding of an entry relating to the individual multimedia content in the table of recordings.

3. The storage method according to claim 1, comprising, when the individual multimedia content is currently being viewed by at least one user during the acquiring and writing to memory of said multimedia content:
　identifying the user;
　at the stopping of the viewing of said individual multimedia content, updating the context data of said user in the table of users associated with said individual multimedia content.

4. A non-transitory computer readable medium, on which is recorded a computer program comprising machine readable instructions for performing a storage method for storing at least one individual multimedia content by an electronic device, said electronic device comprising a database containing a list of users and a table of recorded individual multimedia contents, a system adapted to acquire the individual multimedia content, a calculation system and a storage system, said storage method including, for each stored individual multimedia content:
　allocating a storage space on the storage system by the calculation system;
　adding an entry relating to the individual multimedia content stored in the table of recorded individual multimedia contents;
　acquiring the individual multimedia content and writing to memory said individual multimedia content in the allocated storage space, and
　creating a table of users relating to the stored individual multimedia content, said table of users including, for each user of a sub-set of the list of users contained in the database, one or more context data.

\* \* \* \* \*